United States Patent [19]
Iorio et al.

[11] Patent Number: 5,685,344
[45] Date of Patent: Nov. 11, 1997

[54] COMPOSITE METAL AND METHOD OF MAKING THE SAME

[75] Inventors: Ralph A. Iorio, Bloomfield Hills; Glen A. Gibbs, Warren, both of Mich.

[73] Assignee: ITT Corporation, New York, N.Y.

[21] Appl. No.: 556,751

[22] Filed: Nov. 2, 1995

Related U.S. Application Data

[62] Division of Ser. No. 260,523, Jun. 16, 1994, Pat. No. 5,490,542, which is a division of Ser. No. 806,173, Dec. 12, 1991, Pat. No. 5,339,867.

[51] Int. Cl.$^6$ ............................................. F16L 53/00
[52] U.S. Cl. ..................... 138/140; 138/151; 138/143; 138/156
[58] Field of Search .................... 138/151, 140, 138/143, 156, 137, 138, 128, 147

[56] References Cited

U.S. PATENT DOCUMENTS

| | | | |
|---|---|---|---|
| 2,210,338 | 8/1940 | Quarnstrom | 138/142 |
| 2,255,472 | 9/1941 | Quarnstrom | 138/142 |
| 2,508,465 | 5/1950 | Offinger et al. | 138/142 |
| 3,311,134 | 3/1967 | Howard | 138/142 |
| 3,405,228 | 10/1968 | Polizzano | 138/143 |
| 3,584,655 | 6/1971 | Frank et al. | 138/109 |
| 5,000,369 | 3/1991 | Shotts et al. | 228/147 |
| 5,054,679 | 10/1991 | Shotts et al. | 228/17.5 |
| 5,152,323 | 10/1992 | Shotts et al. | 228/147 |

FOREIGN PATENT DOCUMENTS

| | | |
|---|---|---|
| 1498725 | 10/1967 | France . |
| 2434326 | 3/1980 | France . |
| 3405640 | 8/1985 | Germany . |

*Primary Examiner*—Patrick Brinson
*Attorney, Agent, or Firm*—Thomas N. Twomey; J. Gordon Lewis

[57] ABSTRACT

A composite small-diameter tubing resistant to interaction with materials conveyed therethrough such as liquids containing alcohols or corrosive agents which includes a cylindrical outer metal conduit having a hollow central shaft extending longitudinally therethrough defined by an interior wall; and a continuous non-reactive interior tube surrounded by and positioned within the cylindrical metal conduit. The tubing can be manufactured by a process which includes the steps of a) positioning a length of non-reactive tubing having a predetermined outer diameter within an inner diameter of metal tubing of essentially corresponding length, the metal tube having an unsealed side seam, wherein the inner diameter is greater than the outer diameter of the non-reactive tubing; and b) sealing and reducing the metal tubing to an outer diameter essentially equal to the predetermined outer diameter of the interior tubing. The non-reactive interior tube may be made of a suitable polymeric material.

18 Claims, 2 Drawing Sheets

COMPOSITE METAL AND METHOD OF MAKING THE SAME

This application is a Division of application Ser. No. 08/260,523, filed on Jun. 18 1994, now U.S. Pat. No. 5,490,542, which is itself a Division of application Ser. No. 07/806,173, filed on Dec. 12, 1991 now U.S. Pat. No. 5,339,867.

BACKGROUND OF THE INVENTION

1. Field of the Invention

The present invention relates to small-diameter lined tubes which are resistant to interaction with chemicals conveyed therethrough and a method for making the same. More particularly, this invention pertains to composite tubing stock lined with a corrosion-resistant material and a method for successfully producing the same.

2. Discussion of the Relevant Art

Small-diameter tubing, tubing stock having a diameter less than about 1 inch and more particularly between about 3/16 and about 3/4 inch, is used for a variety of applications. Among these are brake linings, fuel lines, and various conduits in a variety of non-automotive uses. It is necessary that these products be manufactured from durable materials which can withstand prolonged use as well as bumps, jostling and the like. In automotive applications, metals such as low-carbon steel are the materials of choice for reasons of economy and formability, for example. In other applications, other metals or various polymeric materials have been employed.

It is also necessary that the material of choice be essentially non-reactive with the materials conveyed through the tubing. Various fluids conveyed through the tubing exhibit degrees of reactivity with interior tubing surfaces. For instance, the various alternate fuels have components such as methanol (contained in fuels such as M85) and ethanol (in E85)these components can react with metals such as low carbon steel to cause corrosion. The resulting corrosion can weaken the tubing eventually resulting in rupture, leakage and premature failure. Additionally, even materials which are not directly corrosive in a metallic environment can render the metal susceptible to exterior galvanic corrosion. Thus, the useful life of conventional low carbon steel is shortened even when conveying only mildly reactive materials.

Reactivity between the tubing and the materials conveyed within it can also compromise the purity of the conveyed fluid materials. Because of this, inexpensive metal tubing cannot be used in a variety of applications where possible fluid contamination with metal complexes, liquids or the like are not acceptable. In such instances, it is necessary to subject the tubing to post-formation processes such as annealing or to resort to more expensive tubing made of non-reactive metals or to tubing made from polymeric materials.

Polymeric tubing has been suggested as a substitute in various instances to eliminate the problems such as those previously discussed. Unfortunately, polymeric tubing presents a different set of problems. Conventional polymeric tubing is generally composed of materials such as vinyl, as polypropylene, polyvinylchloride and the like. These polymers exhibit poor formability characteristics. Because the polymeric materials exhibit elastic memory, the tubing constructed from such materials is difficult to permanently contour.

Prolonged use of sections of polymeric tubing can lead to the development of static charge. In this phenomenon, static charge builds up along the plastic line and, ultimately, results in numerous, unpredictable pinhole ruptures in the tubing. As can be appreciated, the use of polymeric lines is not desirable in high pressure applications or in situations in which the tubing will convey flammable liquids which could ignite upon escape during rupture. Furthermore, it is difficult to achieve burst strength characteristics in monolithic structures even if problems of static discharge can be obviated.

Even if the problems of formability and static discharge can be overcome, polymeric tubing, exhibits extreme weakness to heat. The polymeric materials employed in conventional plastic tubing sag, weaken or melt at undesirably low temperatures; rendering them impractical for many applications such as use in conjunction with automobile engines.

The materials employed in polymeric tubing also exhibit degradation over time due to interaction with other external environmental factors such as exposure to ultraviolet radiation which results in cross linkage, UV degradation and the like. This reduces tubing thereby rendering the tubing brittle and easily breakable.

Finally, polymeric materials which make up the tubing can interact with certain organic components causing softening, localized deformation of the tubing, or permeation of the organic material through the polymeric material. Thus, a variety of organic fluids cannot be conveyed through polymeric tubing stock.

The use of composite or lined tubing stock composed of an outer metal layer and an interior non-reactive polymeric layer has been proposed. However, to date, only metal tubes having relatively wide inner diameters have been produced by spraying a liquid polymeric material onto the interior of the metal tube by means of an appropriate spray nozzle or other suitable dispensing device inserted into the interior of the metal tube to deliver molten polymeric material directly onto the interior wall. This method generally limits the production of such tubing to tubing stock having an inner diameter of sufficient width to permit insertion of the polymer dispensing device. Because the polymer applicator can only be inserted a relatively short distance into the metal tube, the overall length of lined tubing produced by this method is limited. Given these constraints, it can be appreciated that it has been impossible to employ the method to small-diameter tubing. Furthermore, it has been difficult to assure that the applied polymer plastic is uniformly dispersed over the interior surface of the tubing. Non-uniformities of the polymer deposited on the interior surface of the tubing can result in unwanted narrowing of inner diameter of the tubing causing constriction or blockage or insufficient polymer coating to prevent interaction with the reactive or corrosive fluids conveyed therethrough.

Thus, it is desirable to provide a tubing which exhibits enhanced resistivity to interaction with fluids conveyed therethrough. It is also desirable that this tubing be formable and machineable in subsequent poet production operations. It is also desirable that this material contain a uniform non-reactive lining along its interior surface. It is desirable that the tubing be of sufficiently narrow diameter to permit its use in automotive fuel lines and the like. Finally, it is desirable to provide an inexpensive effective method for producing such a material which eliminates the need for post-treatment processing steps such as annealing.

SUMMARY OF THE INVENTION

The present invention is a composite tubing resistant to interaction with materials conveyed therethrough and a method for making the same. The tubing may be either continuous lengths which can be coiled and cut to length as required or produced immediately as finished lengths. The composite tube of the present invention comprises a cylindrical outer metal conduit having an outer wall and an interiorly oriented wall which defines a central shaft extending longitudinally therethrough, and an interior tube made of a suitable non-reactive material surrounded by and positioned within the cylindrical outer metal conduit. The interior tube has outer and inner wall surfaces. The outer wall surface of the interior tube matingly engages the interiorly oriented wall of the metal conduit by any suitable manner. The interior tubing conforms to the interiorly oriented wall of the metal tubing to surround and define a hollow tubing conduit extending longitudinally through the composite tubing and to protect the surface of the interiorly oriented metal wall from contact with potentially reactive fluids conveyed therethrough.

The method of the present invention comprises the steps of:

- positioning a length of tubing made of a suitable non-reactive material having a predetermined outer diameter within the interior of an unsealed metal tube having an initial inner diameter greater than the predetermined outer diameter of the polymeric tubing; and
- progressively reducing the metal tube after sealing to produce a composite metal tubing having an outer diameter essentially equal to the predetermined outer diameter of the inner non-reactive tubing contained therein.

BRIEF DESCRIPTION OF THE DRAWINGS

In order to more fully understand the composite tube of the present invention and the method of making the same, the following drawing figures are included in which like reference numerals are used throughout in connection with like elements and in which.

DESCRIPTION OF THE PREFERRED EMBODIMENT

The present invention is a composite tube 11 which has an interior surface resistant to interaction or reaction with the materials which are conveyed therethrough. The reactive materials can include various organic fluids such as short-chain alcohols, petroleum fuels containing reactive additives as in the case of alternative fuels, as well as various materials known to be corrosive to metal tubing such as those employed in desalinization units or the like. Other similar reactive and non-reactive fluids can be successfully conveyed through composite metal tubing of the present invention.

Figure 3:
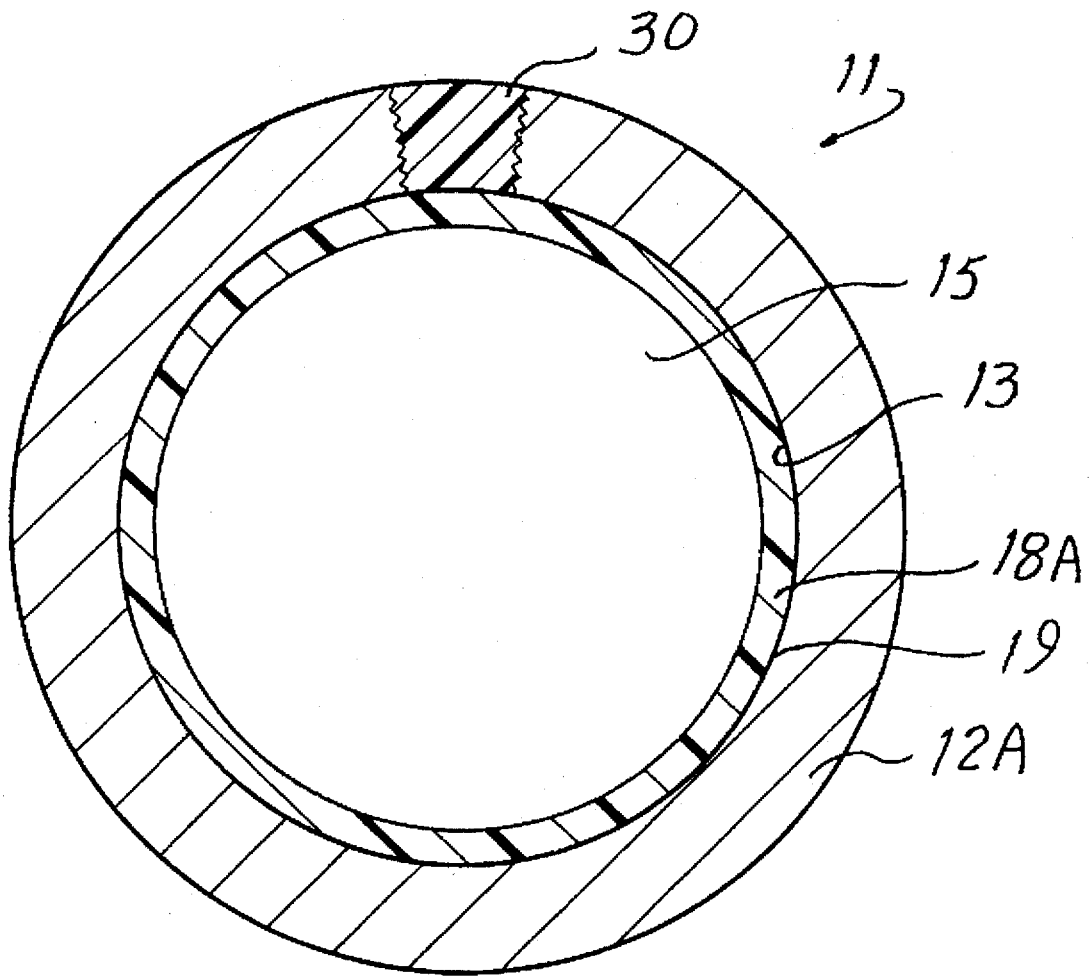
FIG. 3 is a cross-sectional view of the composite metal tube of the present invention.

As shown in FIG. 3, the composite metal tube 11 of the present invention comprises a cylindrical outer metal conduit having an outer wall, an interiorly oriented wall surface 13 which defines a central shaft with a hollow central interior 15 extending longitudinally therethrough, and a continuous interior tube 18A made of a suitable non-reactive material surrounded by and positioned within the cylindrical outer metal conduit 12A. The continuous interior tube 18A has an outer wall surface 19 and an inner wall surface 19. The outer wall surface of the interior non-reactive tube 18A contacts the interiorly oriented wall surface 13 of the metal conduit 12A to provide mating engagement between the two concentrically disposed tubes in a manner which is essentially uniform throughout the length and circumference of the composite tubing 11.

The cylindrical outer metal conduit 12A may be made from any metal or metal alloy or other metallic, organometallic or metal matrix composite material which can be suitably formed, bent, or machined for subsequent fluid conveying operations. These materials include but are not limited to materials which are reactive with various chemicals or chemical constituents conveyed therethrough or are susceptible to galvanic or chemical corrosion. The outer metal conduit 12A is preferably made of a suitably formable and weldable material, with a metal selected from the group consisting of ferritic metals, non-ferritic metals, and alloys thereof being preferred. In situations requiring tube ease of formability and economy, low carbon steel is preferred. Various grades of low carbon steel can be successfully employed in the composite tubing of the present invention. Specifics of steel type vary depending upon end use application but could readily be discerned by one skilled in the art.

The cylindrical outer metal conduit 12A may have a finished outer diameter of any size desired for the given end use application. The outer diameter of the tubing of the present invention is, preferably less than, but not restricted to about ¾ inch with an outer diameter between 3/16 inch and ¾ inch being preferred. The wall thickness of the cylindrical outer metal conduit 12A is dependant on the end use application for the composite tube 11 as well as the drawing and welding operations employed in the tube formation process. In general, the outer metal conduit 12A comprises up to about 99% of the total wall thickness of the composite tube 11 of the present invention with wall thicknesses of the outer conduit 12A between about 40 and about 99% being preferred. The thickness of the walls of the outer metal conduit 12A may be less than about 0.3 inch; with thicknesses between about 0.01 inch and about 0.1 inch being common and thicknesses between about 0.02 inch and about 0.05 inch being preferred. It is to be understood that the wall thickness of the outer metal conduit 12A can be varied according to the requirements for the particular application of composite metal tube 11.

The composite metal tube 11 of the present invention also includes a continuous interior tube 18A made of a suitable non-reactive material having an outer wall surface 19 in contact with the interiorly oriented wall 13 of the cylindrical outer metal conduit 12A to provide essentially uniform mating engagement between the two concentrically disposed tubes. The interior tube conforms to the interiorly oriented wall of the outer metal conduit 12A. The inner wall surface defines a hollow central tubing conduit extending longitudinally through the length of the tubing.

The interior tube 18A may be constructed from any suitable material which is non-reactive in the particular application for which the tubing is to be employed. The material may be either metal or polymeric as desired and required.

The non-reactive material employed may be any material suitable for formation of lengths of interior tubing which is non-reactive with materials to be conveyed therein. The term "polymeric" as employed herein may be defined as a polymolecular complex formed by the union of simple organic monomers. The polymeric material employed herein may be any homopolymer, polymeric blend or copolymeric material which is substantially non-reactive in the presence of the chemicals or compounds to be conveyed through the tubing. In particular, the polymeric material employed is substantially non-reactive in the presence of short chain alcohols, various corrosive agents, metal oxidizers, and the like.

The polymeric material of choice is a thermoplastic material exhibiting thermal stability at temperatures of approximately 500° F. The material employed is preferably extrudable as either a monoaxially or biaxially oriented organic film. In the preferred embodiment, the material is capable of extrusion to thicknesses less than about 0.02 inch with extrusions to thicknesses less than about 0.005 inch being preferred. In the preferred embodiment, the polymeric material is selected from the group consisting of polyamide resins, polytetrafluoroethylene resins, and mixtures thereof. Examples of suitable polyamide resins for use in the present invention include the nylons. Examples of suitable polytetrafluoroethylene resins include those having the trade designation TEFLON.

The non-reactive material employed in the composite tube 11 of the present invention has a wall thickness sufficient to isolate the interiorly oriented wall 13 of the outer metal conduit 12A from any harmful effects of any fluid conveyed therethrough. The thickness of the non-reactive interior tube 18A is sufficient to maintain the integrity of the interior tube 11 without unduly compromising the heat exchange capability of the composite tubing.

The interior non-reactive tube 18A is positioned within the cylindrical outer metal conduit 12A so as to engage its interiorly oriented wall in an essentially uniform manner such that the central shaft is completely defined by and surrounded by non-reactive material throughout its longitudinal length.

The engagement between interior tube 18A and the outer metal conduit 12A may be any suitable mechanical, chemical or a mixture of mechanical and chemical attachment properties. The term "mechanical attachment" is defined herein to encompass physical engagement between the two concentrically disposed tubes which includes but is not limited to interference fits and other frictional and/or compressive engagements. The term "chemical attachment" is defined herein to include any chemical or electrochemical bonding which may occur between the two concentrically disposed tubes. "Mixtures of mechanical and chemical attachment properties" is defined herein to include attachment phenomena such as adhesion. In the preferred embodiment, the engagement between the two concentrically disposed tubes is an interference fit.

The composite tube 11 of the present invention provides the corrosion resistance and resistance to chemical reactions heretofore not found in small-diameter monolith metal tubing while eliminating the problems found in monolith plastic lines such as melting, static discharge, poor formability, pressure restriction, permeation, and degradation previously inherent in supplemental or polymeric tubing.

The steel tubing 11 of the present invention can be formed by a process in which a length of interior tube 18A non-reactive material having a predetermined outer diameter is positioned within the inner diameter of metal conduit 12A of a suitably analogous length. The predetermined outer diameter of the non-reactive tubing 18 which forms interior tube 18A preferably is essentially equal to the desired outer diameter of the finished composite tubing which forms metal conduit 12A. The metal tubing has an initial inner diameter greater than the outer diameter of the non-reactive tubing. Once the non-reactive interior tubing is in position, the external metal tubing can be reduced in size by suitable forming and drawing operations to an outer diameter essentially equal to the predetermined outer diameter of the non-reactive interior tubing. At the outset of processing, the metal tubing, preferably, has an unsealed side seam extending along the length of the tube through which the polymeric tubing 18 can be inserted. The metal tubing is sealed after insertion of the polymeric tubing by any suitable sealing means such as an electrical resistance, TIG, MIG, or laser welding or even lock-seam closure which forms seam seal 30 in the composite tube 11 of the present invention. Once sealed, the metal tube can be drawn and formed to reduce the tubing diameter until it snugly engages the polymeric tubing contained therein to provide concentric orientation of the two tubing materials, one within the other.

Figure 1:
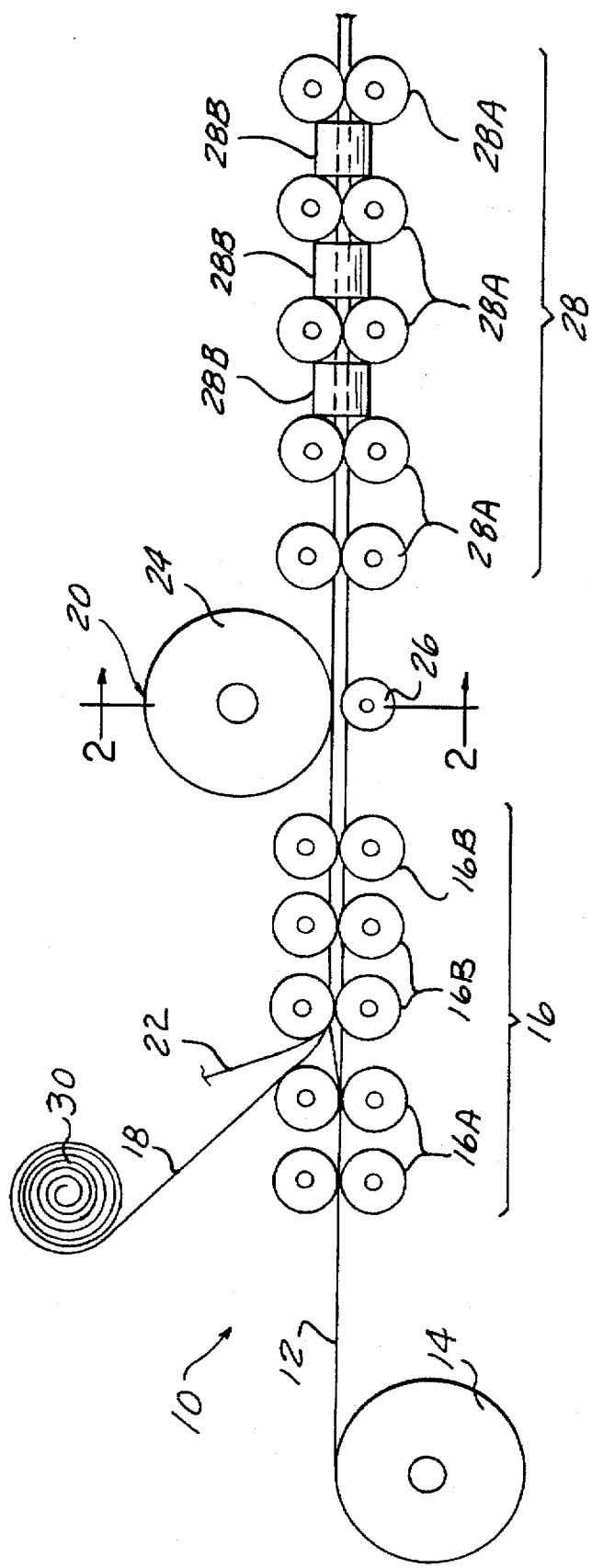
FIG. 1 is a schematic drawing of the composite tube forming process of the present inventions.
Figure 2:
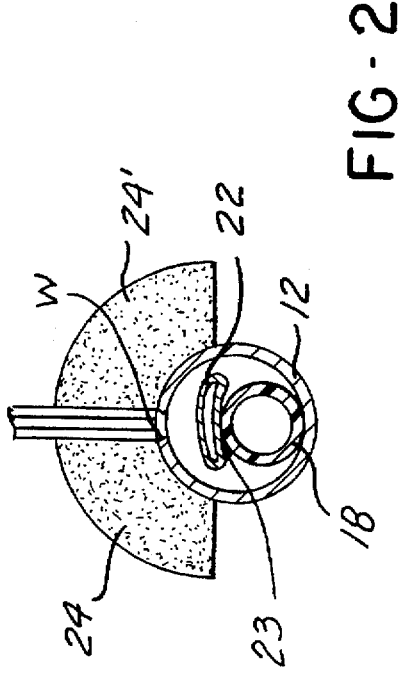
FIG. 2 is a detail drawing in cross-section taken at the welding station along the 2—2 line of FIG. 1 with the pressure roll broken away.

For a more complete understanding of the method of making the composite tube of the present invention, attention is directed to the schematic depiction of the method of the present invention as set forth in FIGS. 1 and 2 and discussed as follows.

The cylindrical outer metal conduit 12A may be previously formed and provided from existing stock into which the non-reactive tubing can be inserted. In the preferred embodiment, the conduit is gradually formed from suitable flat sheet metal stock.

The flat sheet metal stock may be maintained in any manner which will permit its uniform conveyance into and through various tube forming stations. As illustrated in FIG. 1, a continuous portion of flat sheet metal stock 12 maintained on a suitable pay-out reel 14 is paid out from the reel 14 and drawn into tube forming machinery 10 where the sheet metal stock 12 is oriented, sized and operated on by a plurality of forming rolls 16 to progressively form the flat sheet stock into a continuous unsealed metal tube.

As can be appreciated by one skilled in the art, in the initial forming operations the sheet metal stock 12 passes in contact with convex rollers 16A which form the interior and exterior of the tubing surface. The sheet metal stock 12 then, comes into contact with concave rollers 16B which operate only on the exterior surface of the tubing being formed to bring the two side edges into abutment. The exterior sections bring the two longitudinal edges of the sheet metal stock 12 into sufficiently close proximity or abutment with one another to permit subsequent sealing along the seam thus formed.

The interior non-reactive tubing to be employed, i.e. polymeric tubing, may be brought into contact with the metal sheet stock 12 at any time before, during or after the initial roller forming operations. In the preferred embodiment, continuous polymeric tubing 18 is introduced into relationship with the metal sheet stock 12 during roller forming operations.

The continuous polymeric tubing 18 is preferably positioned in the metal tubing in formation during or immediately subsequent to the interior/exterior formation passes implemented by convex rollers 16A. It is preferred that the continuous polymeric tubing 18 enter the tubing at a point in the interior/exterior forming process where enough curvature has been imparted to the sheet metal stock 12 to assist in maintaining the polymeric tubing 18 in position relative thereto. In the preferred embodiment the polymeric tubing is brought into contact with the sheet metal stock 12 immediately prior to the commencement of external forming operations performed as the sheet metal stock passes through concave rollers 16B.

In the process of the present invention, the metal sheet stock 12 is paid off of the payoff 14 and fed to the forming rollers 16 at a first rate ($R_1$). The first rate $R_1$ is sufficient to permit appropriate formation of the sheet metal stock into unsealed tubing as well as permitting sealing of the tubing stock in subsequent steps. While the first rate $R_1$ can be varied, it is generally desirable to maintain a first rate $R_1$ as high as possible to maximize tubing production. For this reason, feed rates between about 150 and about 180 feet per minute are preferred but speeds up to 250–450 feet per minute can be envisioned.

In the process of the present invention, the polymeric tubing is preferably introduced into the metal tubing at any point prior to the welding step. In the preferred embodiment, the polymeric tubing is introduced into the metal tubing immediately prior to external metal tube forming operations performed by external rollers 16B. The rate of introduction or payout of the polymeric tube 18 into the metal tube is greater than the payout rate of the sheet metal stock that forms the surrounding outer metal tube. The differential in payout rates causes the polymeric tube to more rapidly pass through the tube sealing zone and to be maintained in an appropriately taut manner through final forming and drawing steps.

In metal tube forming processes such as that of the present invention, the sealed metal tubing is subjected to post-sealing sizing and drawing operations during which the outer diameter of the sealed metal tube is reduced with concurrent elongation of the tubing stock. Thus, the finished product passes from the final forming station 28 at a rate ($R_2$) faster than the payout rate of the unformed sheet metal stock 12 from reel 14. The increase in speed is proportionally related to the decrease in diameter in the finished product.

In the preferred embodiment of the process of the present invention, the polymeric tube 18 is paid out into the partially formed metal tubing at a rate approximately equal to the production rate of the finished composite tube.

The speed differential between the polymeric tube 18 and the outer metal conduit upon introduction of the tubing is a function of the diameter reduction of the outer metal tubing to be accomplished during the final sizing and forming operations. Preferably, the outer diameter of the outer metal tubing is reduced to a diameter approximately equal to or slightly less than the outer diameter of the polymeric tubing contained therein by progressive contact with sizing rollers 28A and 28B which will be described in detail subsequently. In the preferred embodiment the polymeric tubing 18 is introduced at a rate equal to the rate finished composite tubing passes from the final forming station 28.

The polymeric tubing employed in the process of the present invention has an outer diameter which is approximately 30 to about 70% of the outer diameter of the unsealed metal tubing formed by rollers 16. The payout differential between the two materials is approximately equal to this diameter differential. The diameter of the polymeric tubing 18 is less than about 1inch with diameters between about 3/16 inch and about 3/4 inch being preferred.

The polymeric tubing 18 employed herein may have any suitable wall thickness. The wall thickness may be limited by the tensile strength of the chosen polymeric material during tube formation. In the preferred embodiment, polymeric wall thicknesses between about 0.005 inch and about 0.01 inch are employed.

The polymeric tubing may be made of any suitable thermally stable thermoplastic material. Materials having thermal stability of approximately 500° F. are preferred. The thermoplastic material employed exhibits suitable tensile strength and is unreactive with a variety of chemical materials. As indicated previously, the polymeric tubing preferably consists of a polymer selected from the group consisting of polyamide resins, polytetrafluoroethylene resins, and mixtures thereof.

The polymeric tubing 18 may be produced by any process which provides an adequate supply of tubing stock for the formation process of the present invention. The polymeric tubing 18 may be extruded concurrent with the tube forming process. In such conformation processes, the sheet metal stock payout rate would be modified to provide a final tube production rate compatible with the tubing extrusion rate. Alternately, the polymeric tubing formed in a separate process can be coiled onto a separate polymeric tubing payout reel 30 to permit flexibility in adjusting the rate of tube formation.

The polymeric tubing 18 is paid out into the partially formed metal tubing at a point adjacent to but immediately upstream of gas injection pipe 22. As shown in FIG. 1, gas injection pipe 22 is inserted into the partially formed metal tubing immediately before the first external forming operation at roller 16B. The gas injection pipe 22 extends through the interior of the metal tubing being formed and terminates proximate to and slightly downstream of the tube sealing means 20 to provide cooling and oxidization protection of the sealed metal tubing by directing an inert gas such as nitrogen at the newly sealed seam.

The gas injection pipe 22, preferably, has a cross-sectional contour capable of directing and orienting the polymeric tubing 18 in position in the outer metal tubing, the gas injection pipe 22 preferably has a concave divot 23 extending longitudinally along the pipe 22 which can contact the polymeric tubing passing thereby. The gas injection pipe 22 is interposed between the polymeric tubing 18 and the side edges of the sheet metal stock 12 being brought into abutment through the process of the present invention. This insures proper radial positioning of the inner tube during sealing procedures. The non-reactive polymeric tubing 18 is maintained at a location within the metal tubing 12 opposed to the side seam during the sealing step, as best seen in FIG. 2.

After the tube formation stage, the unsealed metal tubing with the polymeric tubing 18 contained therein is sealed by any suitable procedure. The sealing procedure preferably provides a sealed seam seal 30 having a narrow width; i.e. between about 0.01 and about 0.1 inch. The narrow seam seal 30 occurs in a manner such that any given region of the seam and adjacent metal tube area remains at temperature for an interval less than about 0.5 to 1.5 seconds. Rapid heat dissipation can be augmented further by post sealing gas cooling, water cooling or a combination of both if desired.

Sealing is preferably effected by localized welding. In the preferred embodiment, electric resistance welding is employed. As shown in FIG. 2 the unsealed seam is brought into contact with suitable welding electrodes 24, 24' held in place by an appropriate pressure roll 26. In the preferred embodiment, a 20° arc is employed. The tubing passes by the welding source 20 at a rate capable of providing a suitable uniform weld W.

The sealed metal tubing can then be subjected to post welding steps such as exterior weld metal scarfing and integrity assurance testing (not shown). Once sealed, the sealed outer metal tubing with the smaller diameter polymeric tubing contained inside can pass to the drawing and forming section 28 where diameter reduction of the outer metal conduit can be accomplished. The drawing and forming section 28 consists of a plurality of powered reducing rollers 28A and idle rollers 28B which both convey the outer metal tubing onward and progressively reduce the outer diameter of the sealed metal tubing. The amount of diameter reduction is that sufficient to achieve an interference fit between the outer metal tube and the polymer tube contained inside. In the preferred embodiment, diameter reduction up to and including 50% with complementary increases in the payout rate of the formed, sealed reduced-diameter metal tube are obtained.

While the exterior metal tubing is conveyed by powered reducing rollers 28A, in the preferred embodiment, the polymeric tubing is drawn by its leading edge which is in interfering engagement with the outer metal tube. Thus the polymeric tubing is drawn into the metal tube being formed at a rate essentially equal to the finish rate of the sealed metal tubing ($R_2$). The polymeric tubing payout means is appropriately configured to provide suitable tension throughout the polymeric tubing.

In the method of the present invention, the opportunity for thermal degradation of the polymeric tubing is greatly reduced because of the accelerated feed rate of the polymeric tubing past the weld source. Additionally, the radial positioning of the polymeric tube away from the heat source prevents damage during the sealing process. Finally, the interposition of the gas injection pipe between the polymeric tubing and the weld spot further insulates and protects the polymeric tubing from thermal degradation.

Once the outer tubing has been roller reduced and the interference fit between the polymeric tubing and the outer metal tubing has been obtained, the composite tubing may be cut to length, formed, machined or coiled and stored as required. The need for subsequent tube treatment processes such an annealing is eliminated.

The process outlined may also be employed using other non-reactive inner tubes. Alternately, the composite tubing of the present invention may be produced by a draw die method in which the inner non-reactive tubing of the approximate desired finished diameter is inserted into a preformed outer tubing having an inner diameter greater than the outer diameter of the inner tube. The two distinct tubes are pulled from the output end of the tube forming mechanism. The diameter of the outer tube is progressively reduced to mating contact with the inner tube by passage through suitable die sets.

We claim:

1. A composite metal tube having an interior surface resistant to interaction with materials passing therethrough, the composite tube comprising:

a cylindrical outer metal conduit having an interior wall surface which defines a hollow central interior extending longitudinally therethrough; and a continuous interior tube made of non-reactive material surrounded by a positioned concentrically within said cylindrical outer metal conduit, said continuous interior tube having an outer wall surface in engagement with said interior wall surface, the interior tube having a wall thickness less than about 0.02 inch said continuous interior tube held in engagement within said cylindrical outer metal conduit through a mechanical interference fit existing between the interior surface of the outer metal wall and the outer wall surface of the continuous interior tube, said outer wall of said continuous interior tube having essentially uniform contact characteristics with said interior wall surface circumferentially around the composite tube wherein said interior wall is of essentially uniform thickness.

2. The composite metal tube of claim 1 wherein said cylindrical outer metal conduit has an outer diameter less than about ¾ inch.

3. The composite metal tube of claim 1 wherein said cylindrical outer metal conduit has an outer diameter between about 3/16 inch and about ¾ inch.

4. The composite metal tube of claim 1 wherein said cylindrical outer metal conduit has a wall thickness between about 0.01 inch and about 0.1 inch, said cylindrical outer metal conduit wall thickness comprising at least 50% of total wall thickness of the composite tube.

5. The metal tube of claim 4 wherein said interior tube consists essentially of a polymeric material film, sid polymeric material being substantially non-reactive in the presence of materials interactive with said cylindrical outer metal conduit, and wherein said interior tube has a wall thickness between about 0.005 inch and about 0.01 inch.

6. The metal tube of claim 1 wherein said interior tube consists essentially of a polymeric material which is substantially non-reactive in the presence of short chain organic alcohols.

7. The metal tube of claim 6 wherein said polymeric material consists essentially of a polymer selected from the group consisting of polyamide resins, polytetrafluoroethylene resins, and mixtures thereof.

8. The metal tube of claim 1 wherein said interior tube is held in engagement within said cylindrical outer metal conduit through a mechanical interference fit therebetween.

9. A composite tube resistant to interaction with chemical materials conveyed therein and to static charge, the composite tube comprising:

a polymeric tube having an outer wall surface, the polymeric tube having an outer wall surface, the polymeric tube having a wall thickness less than about 0.02 inch; and a cylindrical metal tube having an outer wall concentrically disposed around and in mating engagement by an interference fit with said outer wall surface of said polymeric tube, said cylindrical metal tube having a wall thickness greater than that of said polymeric tube an having an outer diameter less than about ¾ inch wherein said outer wall of said continuous interior tube and said inner wall surface of said outer metal conduit have essentially uniform contact characteristics longitudinally and circumferentially wherein said interior wall is of essentially uniform thickness.

10. The composite tube of claim 9 wherein said cylindrical tube has an outer diameter between about 3/16 and about ¾ inch.

11. The composite tube of claim 10 wherein said cylindrical metal tube comprises at least 50% of total wall thickness of the composite tube.

12. The composite tube of claim 11 wherein said polymeric tube consists essentially of polyamide resins, polytetrafluorochloroethylene resins, and mixtures thereof.

13. The composite tube of claim 9 wherein said polymeric tube exhibits elevated burst strength characteristics and is resistant to permeation by chemicals conveyed therethrough.

14. Composite tube stock having a total wall thickness, a length and a circumference said composite tube stock comprising:

an outer metal layer having an interior wall surface and a wall thickness less than about 0.3 inch comprising between about 40% and about 99% of the total wall thickness, the outer metal layer having an outer diameter between about 3/16 and 3/4 inch; and an inner non-reactive layer conforming by an interference fit to said interior wall surface of said outer layer, said non-reactive layer composed of an extrudable polymeric material selected from the group consisting of polyamide resins, polytetrafluoroethylene resins and mixtures thereof, said inner non-reactive layer having a wall thickness less than about 0.02 inches, wherein said inner non-reactive layer and said interior wall surface of said outer metal layer have essentially uniform contact characteristics longitudinally and circumferentially wherein said interior wall is of essentially uniform thickness.

15. The composite tube stock of claim 14 wherein said inner non-reactive layer exhibits thermal stability at temperatures up to about 500° F., and wherein said inner non-reactive layer has a wall thickness between about 0.005 inch and about 0.01 inch.

16. The composite metal tube of claim 1 wherein said interior tube exhibits thermal stability at temperatures up to about 500° F.

17. The composite tube of claim 9 wherein said polymeric tube exhibits thermal stability at temperatures up to about 500° F.

18. The composite tube of claim 9 wherein said polymeric tube has a wall thickness between about 0.005 inch and about 0.01 inch.

* * * * *

UNITED STATES PATENT AND TRADEMARK OFFICE
CERTIFICATE OF CORRECTION

PATENT NO. : 5,685,344
DATED : November 11, 1997
INVENTOR(S) : Ralph A. Iorio and Glen A. Gibbs It is certified that error appears in the above-indentified patent and that said Letters Patent is hereby corrected as shown below:

In the Title on page 1, and at column 1, line 1, after "METAL" insert --TUBE--.

Column 1, line 6, after "as vinyl" delete "as".

Column 2, line 19, after "tubing" insert --flexibility--.

Column 2, line 55, delete "poet" and insert --post--.

Column 3, line 39, delete "inventions" and insert --invention--.

Column 3, line 42, after "away" insert --;--.

Column 4, line 1, delete "19", second occurrence.

Column 4, line 55, after "wall", first occurrence, insert --13--.

Signed and Sealed this

Tenth Day of March, 1998

BRUCE LEHMAN

Attest:

Attesting Officer

Commissioner of Patents and Trademarks